United States Patent
Suzudo

(10) Patent No.: US 7,221,509 B2
(45) Date of Patent: May 22, 2007

(54) METHOD AND APPARATUS FOR OPTICAL PICKUP CAPABLE OF PERFORMING AN EFFECTIVE POLARIZATION SPLIT

(75) Inventor: Tsuyoshi Suzudo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 858 days.

(21) Appl. No.: 10/124,430

(22) Filed: Apr. 18, 2002

(65) Prior Publication Data
US 2002/0163723 A1  Nov. 7, 2002

(30) Foreign Application Priority Data
Apr. 18, 2001  (JP) ............................. 2001-119069

(51) Int. Cl.
*G02B 5/30* (2006.01)
(52) U.S. Cl. .................... 359/486; 359/576; 356/365; 369/116
(58) Field of Classification Search ............... 359/486, 359/576
See application file for complete search history.

(56) References Cited

U.S. PATENT DOCUMENTS

| | | | |
|---|---|---|---|
| 5,739,952 A * | 4/1998 | Takeda et al. ............... | 359/495 |
| 6,020,944 A * | 2/2000 | Hoshi ........................... | 349/62 |
| 6,087,007 A * | 7/2000 | Fujii et al. .................... | 428/412 |
| 6,728,034 B1 * | 4/2004 | Nakanishi et al. .......... | 359/566 |

FOREIGN PATENT DOCUMENTS

| | | |
|---|---|---|
| JP | 7-287116 | 10/1995 |
| JP | 7-287121 | 10/1995 |
| JP | 11-64615 | 3/1999 |
| JP | 11-295510 | 10/1999 |
| JP | 11-311709 | 11/1999 |
| JP | 2001-59905 | 3/2001 |
| JP | 2001-066428 | 3/2001 |

* cited by examiner

*Primary Examiner*—Arnel Lavarias
*Assistant Examiner*—Derek S. Chapel
(74) *Attorney, Agent, or Firm*—Oblon, Spivak, McClelland, Maier & Neustadt, P.C.

(57) ABSTRACT

A polarization split device that includes an optically isotropic substrate, an optically anisotropic film, and a diffraction grating. The optically anisotropic film is formed on the optically isotropic substrate. The diffraction grating includes first and second cyclically structural portions. The first cyclically structural portion is formed on a front surface of the optically anisotropic film such that a depression in a rectangular shape is cyclically arranged with a predetermined pitch. The second cyclically structural portion includes an optically transparent material having a refractive index approximately equivalent to a refractive index of the optically anisotropic film and is configured to cover the first cyclically structural portion. Diffraction light having a diffraction angle greater than a predetermined angle among diffraction light diffracted by the diffraction grating is inhibited from being discharged outside.

10 Claims, 3 Drawing Sheets

METHOD AND APPARATUS FOR OPTICAL PICKUP CAPABLE OF PERFORMING AN EFFECTIVE POLARIZATION SPLIT

BACKGROUND OF THE INVENTION

1. Field of the Invention

The present invention relates to a method and apparatus for optical pickup, and more particularly to a method and apparatus for optical pickup that is capable of performing an effective polarization split.

2. Discussion of the Background

As a variety of optical recording media such as a CD (compact disc), a DVD (digital versatile disc), etc. are developed, research and development of suitable optical pickup devices becomes crucial. In general, an optical pickup device for reading to and writing from an optical recording media includes a light source emitting laser light, an optical system including lenses and so on for irradiating an optical recording medium with the laser light emitted from the light source, an optical detection mechanism for detecting reflection laser light reflected by the optical recording medium, and so forth. Such an optical pickup device is typically provided with a polarization split device. The polarization split device allows the laser light directed towards the optical recording medium from the light source to pass entirely therethrough, and causes the laser light to diffract relative to the reflection laser light reflected by the optical recording medium so that the laser light is split. This method uses a light path through which the laser light is caused to travel forward and backward. Such a polarization split device generally includes diffraction gratings having different optical characteristics, e.g., having different transmittance, diffraction efficiency, etc., according to states of a polarization plane of the laser light.

Also, the optical pickup device is generally provided with a quarter-$\lambda$ plate (also referred to as a quarter frequency plate) at an object lens side of the polarization split device. With this quarter-$\lambda$ plate, reflected laser light having a polarization direction rotated by 90 degrees is caused to impinge on the polarization split device so that the reflected laser light is guided to a light detecting device.

In recent years, research and development have been increasingly made for a single optical pickup device that is capable of reading from and writing to a plurality of different optical recording media such as a CD (compact disk) and a DVD (digital versatile disk), for example, having different recording densities.

To read from and write to a plurality of different optical recording media, such as a CD and a DVD, for example, having different recording densities with a single optical pickup device, it is necessary to provide the optical pickup device with two laser light sources having different wave lengths.

When a single optical pickup device with two laser light sources having different wave lengths is provided with two different optical systems for the two laser sources, the size of the optical pickup device becomes large, which may be a problem. To avoid this problem, an optical pickup device having two different laser light sources and a single optical system has been developed. In this development, various components used in the two different optical systems are necessarily made into common components.

The above-described polarization split device is one of the components needed to be modified into common components. One example of the polarization split device made as a common component is described in published Japanese unexamined patent application No. JP11-311709, in which a polarization split device is fabricated based on an LN (lithium niobic acid) substrate with an ion-exchange process. In the ion-exchange process, however, splitting of areas depends on dispersion, and therefore it is very difficult to conduct splitting in a perfect manner.

Another example is described in published Japanese unexamined patent application No. JP11-295510, in which a polarization split device is fabricated based on a diacetylene monomer film to which ultraviolet rays are irradiated. In this case, perfect parallel ultraviolet rays are required to carry out splitting of areas. In addition, reflection light rays from the substrate, scattering light, and the like, may degrade allowable operating conditions. Therefore, it may be very difficult to split every uneven portion in an ideal manner.

Another example is described in published Japanese unexamined patent application No. JP11-064615, in which a polarization split device is fabricated such that patterns are formed with a dry etching process in a high polymer liquid crystal film formed on a glass substance and are then charged with a filler having a refractive index that matches the high polymer liquid crystal film. In the dry etching, however, a side etching or a mask recess may cause an adverse effect on the shape of a diffraction grating, and therefore it may be vary difficult to form a diffraction grating in a perfect rectangular shape.

When a diffraction grating formed in an imperfect rectangular shape is used, even-numbered-order diffraction light, which should not be generated from a design point of view, may be generated and cause reduction of efficiency as well as generation of undesired light. As a result, an adverse effect on a light detection may occur. This leads to an erroneous reading and writing of the optical pickup device relative to an optical recording medium.

SUMMARY OF THE INVENTION

This patent specification describes a novel polarization split device for use in an optical pickup apparatus. In one example, this novel polarization split device includes an optically isotropic substrate, an optically anisotropic film, and a diffraction grating. The optically anisotropic film is formed on the optically isotropic substrate. The diffraction grating includes first and second cyclically structural portions. The first cyclically structural portion is formed on a front surface of the optically anisotropic film such that a depression in a rectangular shape is cyclically arranged with a predetermined pitch along a direction of the front surface of the optically anisotropic film. The second cyclically structural portion includes an optically transparent material having a refractive index approximately equivalent to a refractive index of the optically anisotropic film in a direction of ordinary light rays or of extraordinary light rays and is configured to cover the first cyclically structural portion such that an edge surface of the second cyclically structural portion forms a plane approximately equal to a plane formed by the front surface of the optically anisotropic film. In this polarization device, diffraction light having a diffraction angle greater than a predetermined angle among diffraction light diffracted by the diffraction grating is inhibited from being discharged outside.

The predetermined angle may be a diffraction angle of second-order or higher-order diffracted light.

The predetermined pitch may satisfy a relationship $$\lambda(ns/na) < d < 2\lambda(ns/na), \quad (1)$$

in which λ represents an incident light wave length, ns represents a refractive index of an optically isotropic substrate of a polarization split device, and ns represents a refractive index of an ambient atmosphere around the polarization split device.

The predetermined pitch may also satisfy the relationships:

$$\lambda_2(ns/na) < d < 2\lambda_1(ns/na); \text{ and} \quad (4)$$

$$\lambda_1 < \lambda_2, \quad (5)$$

in which $\lambda_1$ and $\lambda_2$ represent incident light wave lengths, ns represents a refractive index of an optically isotropic substrate of a polarization split device, and na represents a refractive index of an ambient atmosphere around the polarization split device.

The optically anisotropic film may be made of an inorganic substance formed by an oblique deposition process relative to a surface of the optically isotropic substrate.

The pitch may be shorter than the incident light wave length.

The optically anisotropic film may be made of a drawn organic substance.

The optically isotropic substrate may have a polished surface for receiving and discharging light.

The above-mentioned polarization split device may further include a quarter-λ plate adhered to the optically anisotropic film.

The above-mentioned polarization split device may further include a monitoring light ray generation mechanism for gathering incident light and reflecting the incident light as a monitored light ray towards a monitoring photoreceptor for monitoring an amount of the monitored light ray.

This patent specification further describes a novel semiconductor laser unit for use in an optical pickup apparatus. In one example, this novel semiconductor laser unit includes a semiconductor laser source, a polarization split device, and a photoreceptor. The semiconductor laser source emits laser light and is mounted on a board. The polarization split device is defined in any one of the above-described polarization split devices to receive the laser light emitted by the semiconductor laser source. The photoreceptor is mounted on the board at a position irradiated by the laser light diffracted by the polarization split device.

This patent specification further describes another novel semiconductor laser unit for use in an optical pickup apparatus. In one example, this another novel semiconductor laser unit includes a semiconductor laser source, a polarization split device, a photoreceptor, and a monitoring photoreceptor. The semiconductor laser source emits laser light and is mounted on a board. The polarization split device includes a monitoring light ray generation mechanism for gathering incident light and reflecting the incident light as a monitored light ray towards a monitoring photoreceptor for monitoring an amount of the monitored light ray. The polarization split device receives the laser light emitted by the semiconductor laser source. The photoreceptor is mounted on the board at a position irradiated by the laser light diffracted by the polarization split device. The monitoring photoreceptor is mounted on the board at a position irradiated by the monitored light ray generated by the monitored light ray generation mechanism of the polarization split device.

This patent specification further describes a novel optical pickup apparatus. In one example, the novel optical pickup apparatus includes a semiconductor laser unit, an object lens, and a quarter-λ plate. The semiconductor laser unit includes a semiconductor laser source, a polarization split device, and a photoreceptor. The semiconductor laser source emits laser light and is mounted on a board. Any one of the above-described polarization split devices receives the laser light emitted by the semiconductor laser source. The photoreceptor is mounted on the board at a position irradiated by the laser light diffracted by the polarization split device. The object lens irradiates an optical recording medium with the laser light emitted from the semiconductor laser unit. The quarter-λ plate converts a polarization plane of the laser light in a light path between the polarization split device of the semiconductor laser unit and the optical recording medium.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
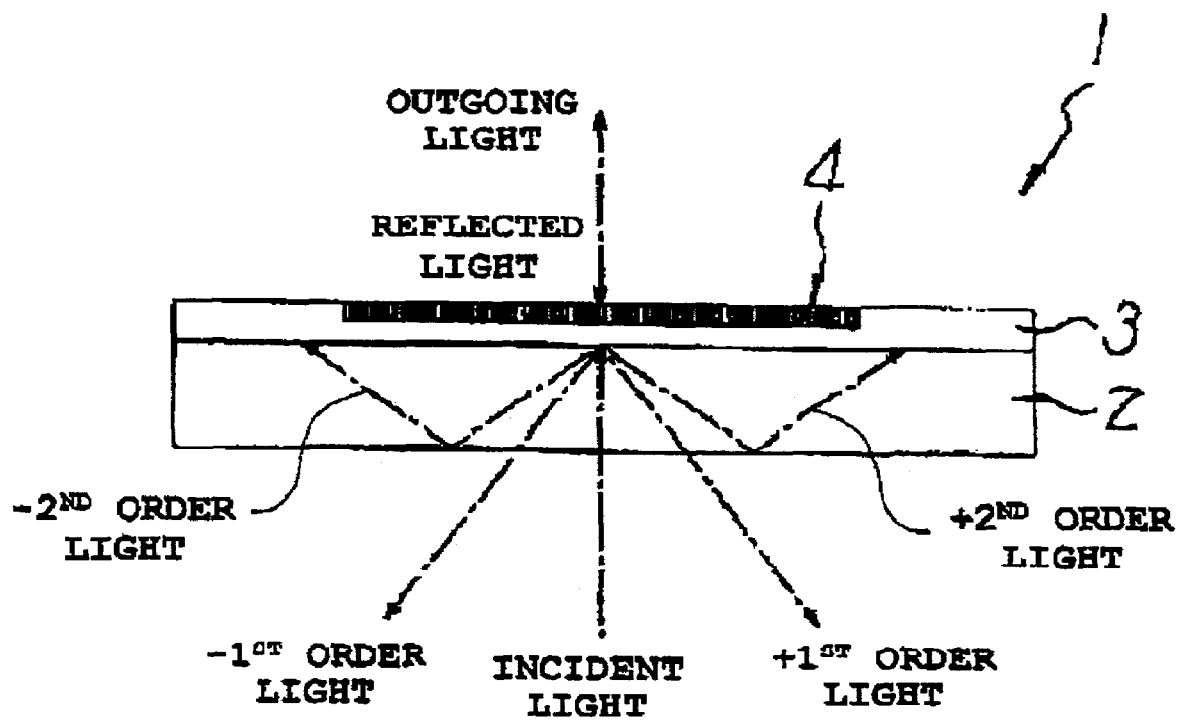
FIG. 1 is an illustration showing a polarization split device according to an embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, particularly to FIG. 1, a polarization split device 1 according to a preferred embodiment of the present invention is shown. FIG. 1 shows a side view of the polarization split device 1 used for an optical pickup relative to a CD (compact disk). The polarization split device 1 includes an optically isotropic substrate 2 made of, e.g., a borosilicate glass (e.g., BK7) and that has a thickness of 0.5 mm, for example. The substrate 2 has a polished surface and has a total internal reflection angle of 41.5 degrees, for example.

The polarization split device 1 also includes an optically anisotropic film 3 made of inorganic substance such as a ditantalum pentaoxide ($Ta_2O_5$), for example, and that has a thickness of 10 microns, for example. As illustrated in FIG. 1, the film 3 is provided on a surface of the BK7 substrate 2 and includes a diffraction grating 4 arranged on a surface of the film 3. The diffraction grating 4 has an optically isotropic nature and is provided with a refractive index for ordinary rays of 1.59, for example, and a refractive index for extraordinary rays of 1.67, for example. That is, in the diffraction grating 4, a difference between the refractive indexes for ordinary rays and extraordinary rays is 0.08. In addition, the above-mentioned film 3 is formed by an oblique deposition process, for example.

Figure 2:
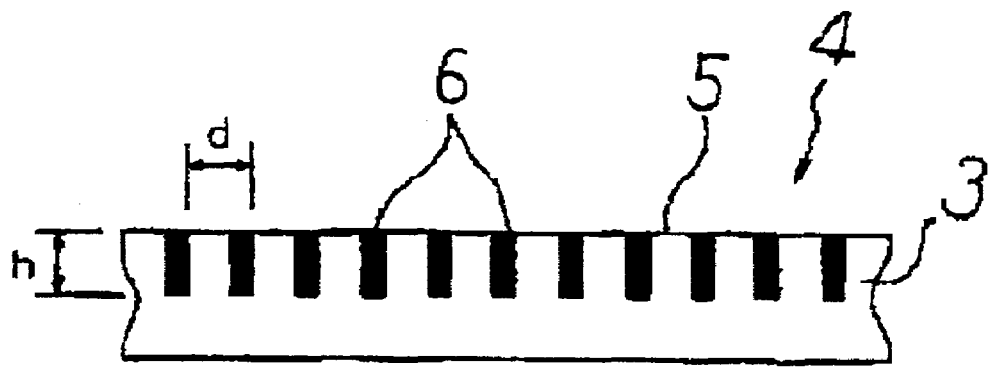
FIG. 2 is an illustration showing in an enlarged form a film of $Ta_2O_5$ included in the polarization split device of FIG. 1.

FIG. 2 shows an enlarged side view of the $Ta_2O_5$ film 3. The diffraction grating 4 formed on the surface of the $Ta_2O_5$ film 3 includes a portion 5, e.g. a front portion, having depressions in a rectangular shape. The portion 5 may be referred to as a first cyclic structural portion. In the portion 5, the depressions have a depth h in a vertical direction in FIG. 2 and a pitch d in a horizontal direction in FIG. 2.

The diffraction grating 4 is formed by a dry etching process using an etching gas (e.g., a $CF_4$ gas) with a mask for registration so that the depth h is 4.88 microns and the pitch d is 2.0 microns. The depressions in the portion 5 of the diffraction grating 4 are filled with a filler 6 (e.g., an acrylic resin) such that a top surface of the filler 6 is at the same plane as the surface of the $Ta_2O_5$ film 3. The filler 6 filled in the portion 5 has the same pitch as that of the portion 5 and forms a second cyclic structural portion. In this example, the refractive index of the filler 6 is 1.59, for example, which is equivalent to that for ordinary rays of the $Ta_2O_5$ film 3.

The portion 5 of the diffraction grating 4 is arranged approximately in parallel to the direction of the surface of the $Ta_2O_5$ film 3. When an incident light wave length is λ, a refractive index of an optically isotropic substrate of a polarization split device is ns, and a refractive index of an ambient atmosphere around the polarization split device is na, the pitch d is set to a value within a range to satisfy the relationship $$\lambda(ns/na) < d < 2\lambda(ns/na). \quad (1)$$

As described above, the depth h can be set to 4.88 microns and the pitch d can be set to 2.0 microns.

In this example, the filler 6 filled in the portion 5 of the diffraction grating 4 is, as described above, an acrylic resin, for example, but is not limited to such. The filler 6 may be a resin having a refractive index approximately equivalent to that of the refractive index for ordinary rays of the $Ta_2O_5$ film 3.

Figure 3:
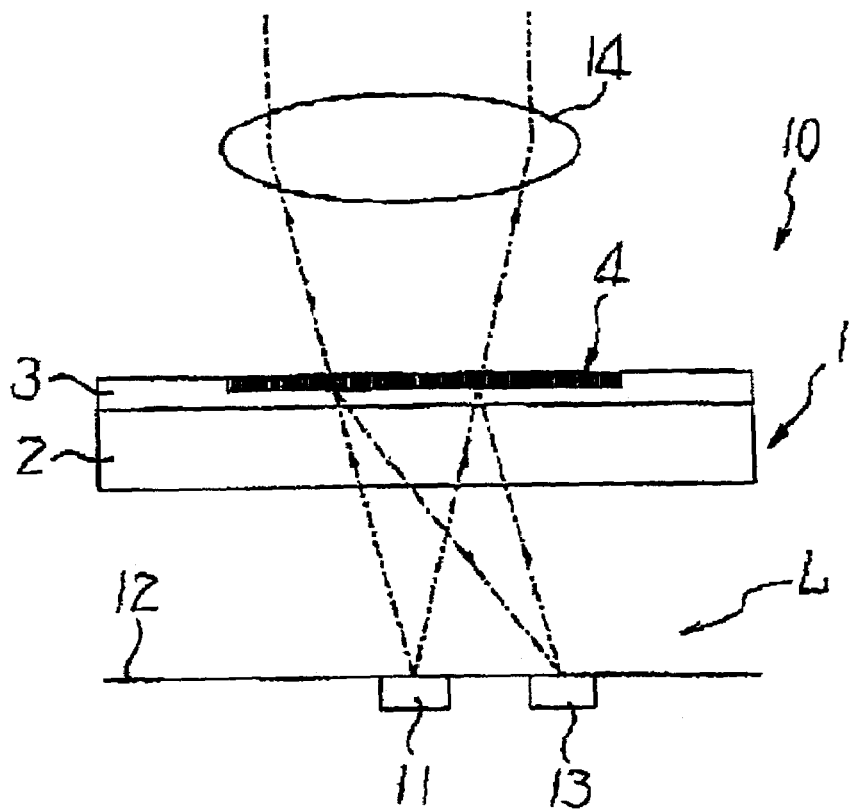
FIG. 3 is an illustration showing a part of an optical pickup apparatus using the polarization split device of FIG. 1.

Referring to FIG. 3, an optical operation of an optical pickup apparatus 10 including the above-described polarization split device 1 is explained. FIG. 3 shows a main part of the optical pickup apparatus 10 that further includes a laser source 11 (e.g., a laser diode) for emitting laser light as an incident light ray having a wave length of 780 nm, for example, in use for a CD (compact disk). The laser source 11 is mounted to a surface 12 of a circuit board. On this surface 12, a photoreceptor 13 is mounted at a position in accordance with a diffraction angle of the polarization split device 1.

In this example, the polarization split device 1, the laser source 11 mounted to the surface 12 of the circuit board, and a detector (not shown) are integrated into a semiconductor laser unit L. In the direction of the laser light emission, the polarization split device 1 is arranged such that the BK7 substrate 2 faces the laser source 11. At an opposite side of the polarization split device 1 relative to the laser source 11, an object lens 14 is disposed. Between the polarization split device 1 and the object lens 14, a quarter-λ plate (not shown), a collimate lens (not shown), etc. are arranged.

In this optical pickup apparatus 10, the laser source 11 is driven to emit linearly polarized light in parallel with the direction of ordinary rays of the $Ta_2O_5$ film 3. The laser light emitted from the laser source 11 enters the BK7 substrate 2. The laser light passes through the polarization split device 1 without causing diffraction, regardless of the presence or absence of the diffraction grating 4. This is because the acrylic resin filler 6 having the refractive index equivalent to that for ordinary rays of the $Ta_2O_5$ film 3 is filled in the diffraction grating 4.

The laser light passing through the polarization split device 1 reaches a surface of the CD (not shown) through the quarter-λ plate, the collimate lens, the object lens 14, and so on. The laser light impinging on the surface of the CD is reflected by a reflection layer of the surface of the CD and is brought to pass again through the quarter-λ plate, the collimate lens, the object lens 14, and so on, to enter the polarization split device 1 through the diffraction grating 4.

Here, the reflected laser light incident on the polarization split device 1 has passed through the quarter-λ plate twice (once forward and once backward), and therefore the polarization plane of the laser light is converted twice by the quarter-λ plate so that the laser light becomes linearly polarized laser light orthogonal to the originally incident laser light. Thereby, the reflected laser light converted in the form of the linearly polarized laser light that is in parallel with the direction of extraordinary rays of the $Ta_2O_5$ film 3 enters the polarization split device 1. Since the difference of the refractive index around the diffraction grating 4 of the $Ta_2O_5$ film 3 is 0.08, as described above, the reflected laser light incident on the polarization split device 1 is diffracted.

It should be noted that even-numbered-order diffracted light is not theoretically generated when the diffraction grating has a rectangular shape. In this example, since the diffraction grating is provided with the depth h of 4.88 microns, a difference of the light paths in the top and bottom of the diffraction grating is one-half λ, and therefore zero-order diffracted light, or even-numbered-order diffracted light, is not output. As a result, the plus and minus first-order diffracted light are selectively generated.

However, forming the grating of the portion 5 in a perfect rectangular shape is very difficult. For example, in the dry etching, a side etching or a mask recess may cause an adverse effect on the shape of a diffraction grating such that the portion 5 of the diffraction grating 4 is formed in a trapezoidal shape, for example. This leads to a generation of the plus and minus second-order diffracted light, or diffracted light of an even-numbered order. If the plus and minus second-order diffracted light, or an even-numbered order diffracted light, are output from the polarization split device 1, such output diffracted light becomes stray light that may adversely affect signal processing.

When the diffraction angle of the diffraction grating 4 is θd, the number of diffraction order is m, and the total internal reflection angle of the BK7 substrate 2 is θc, the diffraction angle θd and the total internal reflection angle θc are represented by the following equations (2) and (3), respectively;

$$\sin \theta d = m(\lambda/d), \text{ and} \quad (2)$$

$$\sin \theta c = na/ns. \quad (3)$$

In this example, the portion 5 of the diffraction grating 4 is arranged approximately in parallel to the direction of the surface of the $Ta_2O_5$ film 3, as described above, and the pitch d is set to a value within a range to satisfy the above-mentioned relationship (1). Therefore, the following relationship may be obtained according to the relationship (1) and the equations (2) and (3);

$$(na/ns)m/2 < \sin \theta d < (na/ns)m.$$

That is, by setting the pitch d to a value within a range to satisfy the relationship (1), the angle θd of the diffracted light of the second order and higher becomes greater than the total internal reflection angle θc and the angle θd of the diffracted light of the first order becomes smaller than the total internal reflection angle θc. With this, the diffracted light of the second order and higher are not output from the polarization split device 1, and thereby a generation of stray light in the optical system can be suppressed. As a result, the operation associated with the signal detection system can be made stable.

More specifically, in this example, the pitch d is set to 2.0 microns, and therefore the plus and minus first-order light are diffracted with an angle of 23.0 degrees and the plus and minus second-order light are diffracted with an angle of 51.3 degrees. On the other hand, the total internal reflection angle of the BK7 substrate 2 is approximately 41.5 degrees, and therefore the plus and minus second-order light on the surface of the BK7 substrate 2 cause total internal reflection and are not discharged outside the polarization split device 1, as shown in FIG. 1.

In this way, the optical pickup apparatus 10 can prevent a generation of stray light in the optical system and properly perform, in a stable manner, operations associated with the system of the signal detection based on the laser light received with the photoreceptor 13.

In this example, it is also not necessary to apply a special coating to the surface of the BK7 substrate 2 since the BK7 substrate 2 has the polished surface. For this reason, the polarization split device 1 can be fabricated at a relatively low cost.

In addition, the Ta$_2$O$_5$ film 3 can be formed by an oblique deposition process and therefore a pillar-like microstructure (not shown) having a length shorter than the light wave length is formed inside the Ta$_2$O$_5$ film 3. That is, by using the oblique deposition process a pillar-like microstructure can be easily formed. Thereby, it becomes possible to fabricate the polarization split device 1 having a stable anisotropic film even in a mass production and at a cost lower than in a case of applying an optically anisotropic single crystal for the optically anisotropic film.

Figure 4:
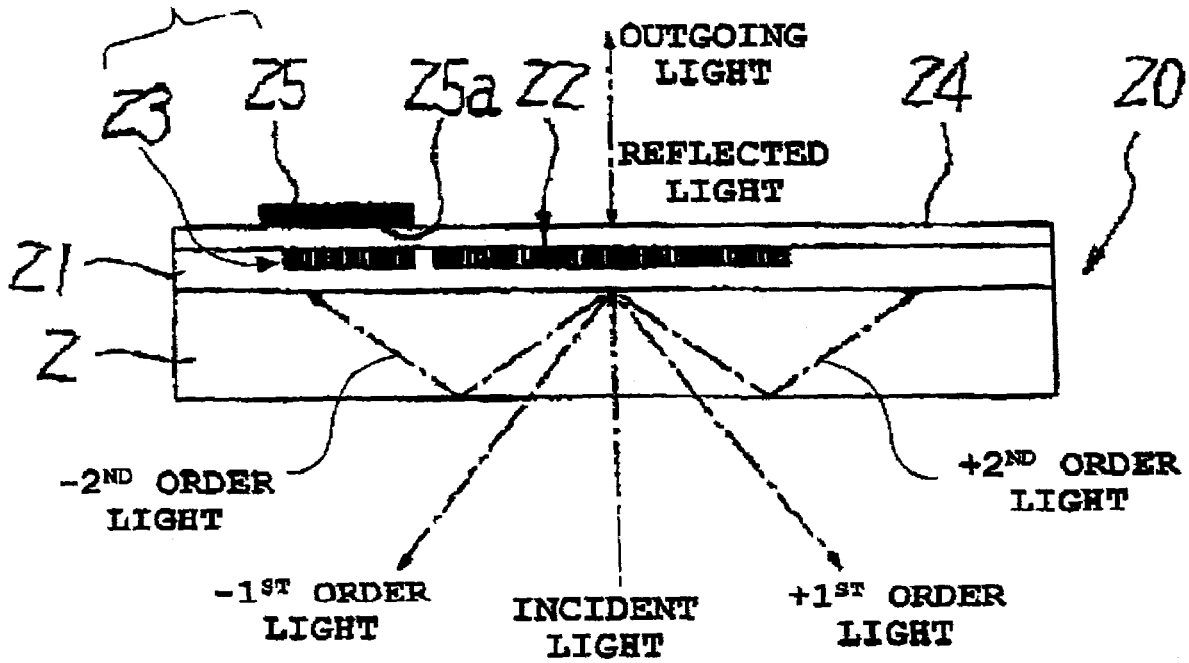
FIG. 4 is an illustration showing a polarization split device according to another embodiment of the present invention.

Next, a polarization split device 20 according to another preferred embodiment of the present invention is explained with reference to FIG. 4. FIG. 4 shows a side view of the polarization split device 20 that includes the optically isotropic substrate 2. As described in the description above for the polarization split device 1, the optically isotropic substrate 2 is made of a borosilicate glass (e.g., BK7) and has a thickness of 0.5 mm, for example, a polished surface, and a total internal reflection angle of 41.5 degrees, for example.

The polarization split device 20 also includes an optically anisotropic film 21 made of a polyester resin, for example, which is drawn into the film 21 having a thickness of 50 microns, for example. As illustrated in FIG. 4, the polyester film 21 is adhered, e.g. with an ultraviolet curing resin, on a surface of the BK7 substrate 2. As noted in the embodiment of FIG. 1, the diffraction grating 4 may have a refractive index for ordinary rays of 1.58 and a refractive index for extraordinary rays of 1.69. That is, in the polyester film 21, a difference between the refractive indexes for ordinary rays and extraordinary rays is 0.11.

The polyester film 21 has a surface on which diffraction gratings 22 and 23 having depressions in a rectangular shape are formed. In the diffraction gratings 22 and 23, the depressions are provided with a depth h (not shown) and a pitch d (not shown) in a manner similar to those as described in the polarization split device 1 of FIG. 2. The diffraction grating 22 splits polarized light rays and the diffraction grating 23 monitors an amount of incident light.

The depressions of the diffraction gratings 22 and 23 can be formed by a dry etching process using an etching gas (e.g., an oxygen gas) with a metal mask. The depressions of the diffraction gratings 22 and 23 are completely filled with the acrylic resin filler 6, which is described in the polarization split device 1 of FIG. 2. The filler 6 may have a reflection index of 1.59 in the ordinary light direction, which is approximately equivalent to that of the polyester film 21.

The depressions of the diffraction gratings 22 and 23 are arranged approximately in parallel to the direction of the surface of the polyester film 21 (horizontal direction in FIG. 4). When incident light wave lengths are $\lambda_1$ and $\lambda_2$, a refractive index of an optically isotropic substrate of a polarization split device is ns, and a refractive index of an ambient atmosphere around the polarization split device is na, the pitch d is set to a value within a range to satisfy relationships:

$$\lambda_2(ns/na) < d2\lambda_1(ns/na), \text{ and} \quad (4)$$

$$\lambda_1/\lambda_2. \quad (5)$$

In this example, the diffraction gratings 22 and 23 are provided with a depth h of 3.4 microns and a pitch d of 1.8 microns. Also, in this example the wave lengths $\lambda_1$ and $\lambda_2$ are 650 nm and 780 nm, respectively.

To the polyester film 21, a quarter-λ plate 24 made of polyethylene is adhered with an ultraviolet curing resin, e.g., as shown in FIG. 4. A reflection film 25 made of chromium can also be adhered to a surface of the quarter-λ plate 24 opposite to the polyester film 21. The reflection film 25 is positioned to overlay the diffraction grating 23. Here, the diffraction grating 23, the reflection film 25, and so on, constitute a monitoring light ray generation mechanism 26.

Figure 5:
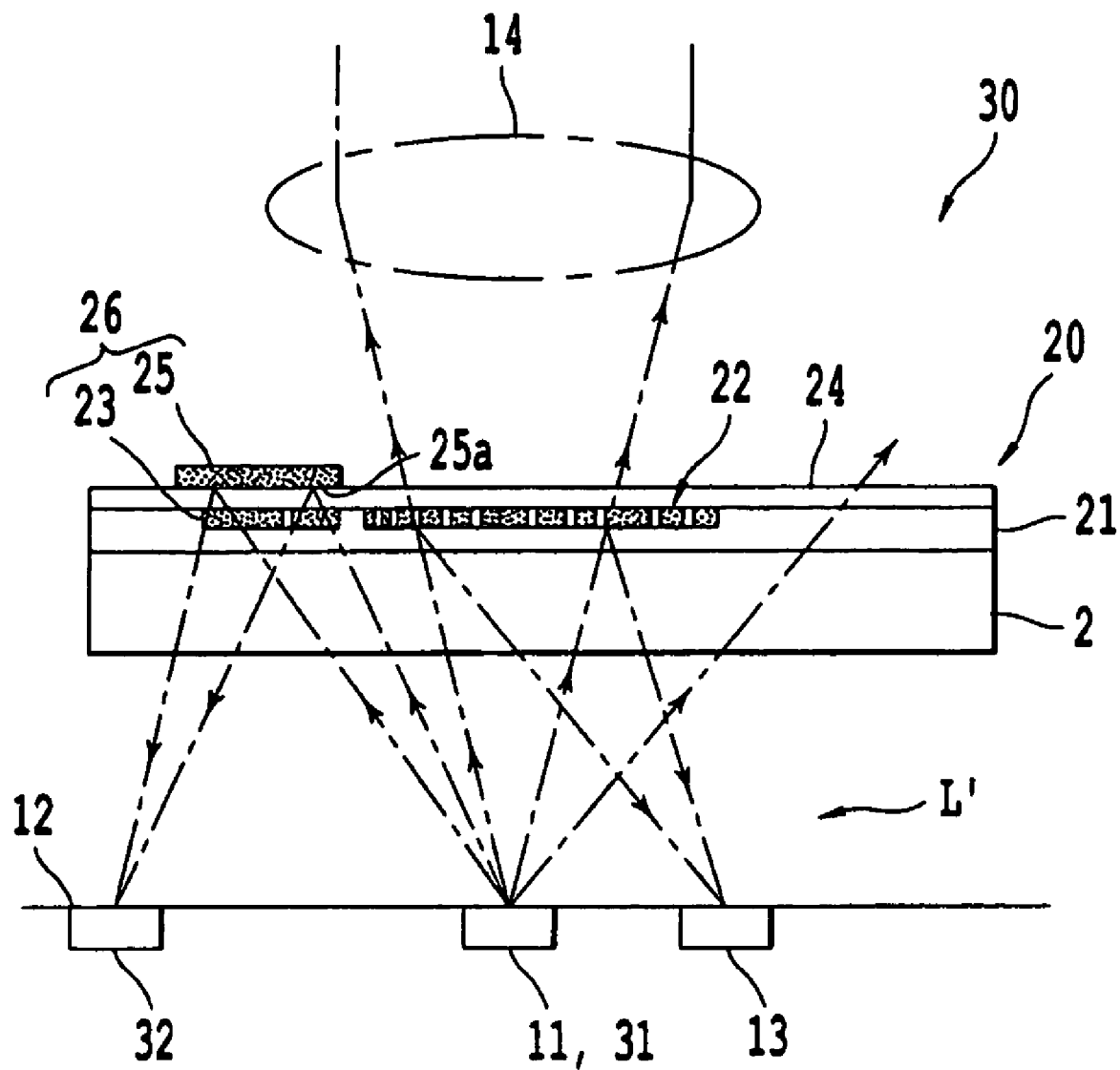
FIG. 5 is an illustration showing a part of an optical pickup apparatus using the polarization split device of FIG. 4.

Referring to FIG. 5, an optical operation of an optical pickup apparatus 30 including the above-described polarization split device 20 is explained. FIG. 5 shows a main part of the optical pickup apparatus 30 that further includes the laser source 11 (e.g., a laser diode) and a laser source 31 (e.g., a laser diode). The laser source 11 can be the same as the one described in the description of the optical pickup apparatus 10 of FIG. 3 and emits laser light as an incident light ray having a wave length of 780 nm, for example, in use for a CD (compact disk). The laser source 31 emits laser light having a wave length of 650 nm, for example, in use for a DVD (digital video disk). The laser sources 11 and 31 and the photoreceptor 13 are mounted to the surface 12 of a circuit board.

In this example, the polarization split device 20, the laser sources 11 and 31 mounted to the surface 12 of the circuit board, and a detector (not shown) are integrated into a semiconductor laser unit L'.

To the surface 12, a monitoring photoreceptor 32 is mounted. The monitoring photoreceptor 32 monitors the laser light emitted from the laser sources 11 and 31 to perform an automatic power control (APC) so that the laser lights of the laser sources 11 and 31 are made stable. With this, the optical pickup apparatus 30 can perform operations in a stable manner.

In this optical pickup apparatus 30, linearly polarized light in parallel with the direction of ordinary rays of the polyester film 21 are brought to enter the BK7 substrate 2 of the polarization split device 20. The laser light passes through the polarization split device 20 without causing diffraction since the acrylic resin filler 6 having the refractive index approximately equivalent to that for ordinary rays of the polyester film 21 is filled in the diffraction grating 22.

The laser light passing through the polarization split device 20 reaches a surface of the CD (not shown) or the DVD (not shown) through optical components including the quarter-λ plate 24, a collimate lens (not shown), the object lens 14, and so on. The laser light impinging on the surface of the CD or the DVD is reflected by a reflection layer of the surface of the CD or the DVD and is brought to pass again through the quarter-λ plate 24, the collimate lens (not shown), the object lens 14, and so on, to enter again the polarization split device 20.

Here, the reflected laser light incident on the polarization split device 20 has passed through the quarter-λ plate 24 twice (once forward and once backward), and therefore the polarization plane of the laser light is converted twice by the quarter-λ plate 24 so that the laser light becomes linearly polarized laser light orthogonal to the originally incident laser light at the diffraction grating 22. Thereby, the reflected laser light converted in the form of the linearly polarized laser light that is in parallel with the direction of extraordinary rays of the polyester film 21 enters the diffraction grating 22 of the polarization split device 20. Since the difference of the refractive index around the diffraction grating 22 is 0.11, as described above, the reflected laser light incident on the polarization split device 20 is diffracted by the diffraction grating 22.

It should be noted that even-numbered-order diffracted light is not theoretically generated when the diffraction grating has a perfect rectangular shape. In this example, since the diffraction grating is provided with a depth h of 3.4 microns, a difference of the light paths in the top and bottom of the diffraction grating is one-half λ relative to both wave lengths, and therefore zero-order diffracted light, or even-numbered-order diffracted light, is not output. As a result, the plus and minus first-order diffracted light are selectively generated.

However, forming the diffraction grating 22 having the depressions in a perfect rectangular shape is very difficult. For example, in dry etching, a side etching or a mask recess may cause an adverse effect on the shape of the diffraction grating 22 such that the depressions of the diffraction grating 22 are formed in a trapezoidal shape, for example. This leads to a generation of the plus and minus second-order diffracted light, or diffracted light, of an even-numbered order. If the plus and minus second-order diffracted light, or an even-numbered order diffracted light, are output from the polarization split device 20, such output diffracted light becomes stray light that may adversely affect signal processing.

When the diffraction angle of the diffraction grating 4 is θd, the number of diffraction order is m, and the total internal reflection angle of the BK7 substrate 2 is θc, the diffraction angle θd and the total internal reflection angle θc are represented by the following equations (2) and (3), respectively:

$$\sin \theta d = m(\lambda/d), \text{ and} \quad (2)$$

$$\sin \theta c = na/ns. \quad (3)$$

In this example, the depressions of the diffraction grating 22 are arranged approximately in parallel to the direction of the surface of the polyester film 21, and the pitch d is set to a value within a range to satisfy the above-mentioned relationship (4). Therefore, as described in the description of the optical pickup apparatus 10 of FIG. 3, according to the equations (2) and (3) and the relationship (4), the angle θd of the diffracted light of the second order and higher becomes greater than the total internal reflection angle θc and the angle θd of the diffracted light of the first order becomes smaller than the total internal reflection angle θc. With this, diffracted light of the second order and higher is not output from the polarization split device 20, and thereby a generation of stray light in the optical system can be suppressed. As a result, a stable operation associated with the signal detection system can be realized.

In addition, as clearly understood from the relationship (4), the diffraction angle θd depends on the wave lengths $\lambda_1$ and $\lambda_2$. The diffraction angle θd of the wave length $\lambda_2$, which in this example is 780 nm, is greater than that of the shorter wave length $\lambda_1$, which in this example is 650 nm. Therefore, in using the two laser lights having the different wave lengths $\lambda_1$ and $\lambda_2$, the range of the pitch d can be determined with an upper limit by the shorter wave length $\lambda_1$ and a lower limit by the longer wave length $\lambda_2$. With this, it becomes possible to make the polarization split device 20 capable of inhibiting a higher-order diffracted light having a second-order diffraction angle or higher, as a predetermined diffraction angle, when using the two laser lights having the different wave lengths $\lambda_1$ and $\lambda_2$ to be incident on the single polarization split device 20.

In this example, the plus and minus first-order light of the 780-nm wave length laser light are diffracted with an angle of 25.7 degrees and the plus and minus second-order light thereof are diffracted with an angle of 60.1 degrees. Also, the plus and minus first-order light of the 650-nm wave length laser light are diffracted with an angle of 21.2 degrees and the plus and minus second-order light thereof are diffracted with an angle of 46.2 degrees.

On the other hand, the total internal reflection angle of the BK7 substrate 2 is approximately 41.5 degrees, and therefore the plus and minus second-order light of both the 780-nm and 650-nm wave length laser lights on the surface of the BK7 substrate 2 cause the total internal reflection and are not discharged outside the polarization split device 20, as shown in FIG. 3.

Thereby, the optical pickup apparatus 10 can prevent a generation of stray light in the optical system and properly perform in a stable manner operations associated with the system of the signal detection based on the laser light received with the photoreceptor 13.

In this example, the polyester film 21, can be a drawn organic film made of polyester applied as an optically anisotropic film. Thereby, it becomes possible to fabricate the polarization split device 20 at a cost lower than in a case of applying an optically anisotropic single crystal to the optically anisotropic film.

In addition, if the quarter-λ plate 24 is integrated into the polarization split device 20, the number of components used in the optical system can be reduced. Accordingly, the number of steps for assembling the optical pickup apparatus 30 can be reduced and, as a result, the cost of manufacturing can be reduced.

A part of the laser light may be extended outside from the laser light incident on the diffraction grating 22 of the polarization split device 20 and input into the diffraction grating 23. The laser light incident on the diffraction grating 23 is used as a monitor light ray and is reflected by a reflection surface 25a of the reflection film 25. The reflected monitored laser light is again input into the diffraction grating 23 and is polarized. Then, the polarized monitored laser light is incident on the monitoring photoreceptor 32. The monitored laser light received by the monitoring photoreceptor 32 is used at the APC to make the laser light from the laser sources 11 and 31 stable.

By guiding the laser light emitted from the laser sources 11 and 31 to the monitoring photoreceptor 32, the amount of the laser light monitored by the monitoring photoreceptor 32 does not depend on the wave length of the outgoing laser light. Thereby, the laser light amount stabilizing operations including the APC and the like that are conducted in accordance with the laser light amount guided to the monitoring photoreceptor 32 can be improved in reliability.

Further, in this example, laser light extended outside an effective diameter of the laser light directed to the CD or the DVD can be used as a monitored light, and therefore the laser light amount monitoring can be performed without reducing the amount of the laser light directed to the CD or the DVD. As a result, the laser light emitted from the laser source can be made stable and the optical pickup apparatus 30 can operate in a stable manner.

In addition, by integrating the monitoring light ray generation mechanism 26 into the polarization split device 20, as shown in FIG. 4, the optical pickup apparatus 30 and the entire system employing the optical pickup apparatus 30 are able to perform operations in a stable manner.

Numerous additional modifications and variations are possible in light of the above teachings. It is therefore to be understood that within the scope of the appended claims, the disclosure of this patent specification may be practiced otherwise than as specifically described herein.

This patent specification is based on Japanese patent application No. JPAP2001-119069 filed on Apr. 18, 2001 in the Japanese Patent Office, the entire contents of which are hereby incorporated herein by reference herein.

What is claimed is:

1. A polarization splitting device comprising:
an optically isotropic substrate;
an optically anisotropic film formed on said optically isotropic substrate; and
a diffraction grating comprising:
a first cyclically structural portion formed on a first surface of said optically anisotropic film such that depressions are cyclically arranged with a predetermined pitch along a direction of the first surface of said optically anisotropic film; and
a second cyclically structural portion comprising an optically transparent material filling in the depressions and having a refractive index approximately equivalent to a refractive index of said optically anisotropic film in a direction of ordinary light rays and extraordinary light rays and configured to cover said first cyclically structural portion such that an edge surface of said second cyclically structural portion forms a plane approximately equal to a plane formed by the front surface of said optically anisotropic film,
wherein diffraction light having a diffraction angle greater than a predetermined angle among diffraction light diffracted by said diffraction grating is inhibited from being discharged outside of said optical isotropic substrate; and
wherein said predetermined pitch satisfies a relationship $\lambda(ns/na) < d < 2\lambda(ns/na)$, wherein $\lambda$ represents an incident light wave length, ns represents a refractive index of an optically isotropic substrate of a polarization split device, and na represents a refractive index of an ambient atmosphere around the polarization split device.

2. A polarization splitting device comprising:
an optically isotropic substrate;
an optically anisotropic film formed on said optically isotropic substrate; and
a diffraction grating comprising:
a first cyclically structural portion formed on a first surface of said optically anisotropic film such that depressions are cyclically arranged with a predetermined pitch along a direction of the first surface of said optically anisotropic film; and
a second cyclically structural portion comprising an optically transparent material filling in the depressions and having a refractive index approximately equivalent to a refractive index of said optically anisotropic film in a direction of ordinary light rays and extraordinary light rays and configured to cover said first cyclically structural portion such that an edge surface of said second cyclically structural portion forms a plane approximately equal to a plane formed by the front surface of said optically anisotropic film,
wherein diffraction light having a diffraction angle greater than a predetermined angle among diffraction light diffracted by said diffraction grating is inhibited from being discharged outside of said optical isotropic substrate; and
wherein said predetermined pitch satisfies relationship:

$\lambda_2(ns/na) < d < 2\lambda_1(ns/na)$ wherein $\lambda_1$ and $\lambda_2$ represent incident light wave lengths, ns represents a refractive index of an optically isotropic substrate of a polarization split device, and na represents a refractive index of an ambient atmosphere around the polarization split device.

3. A polarization splitting device comprising:
comprising:
an optically isotropic substrate;
an optically anisotropic film formed on said optically isotropic substrate; and
a diffraction grating comprising:
a first cyclically structural portion formed on a first surface of said optically anisotropic film such that depressions are cyclically arranged with a predetermined pitch along a direction of the first surface of said optically anisotropic film; and
a second cyclically structural portion comprising an optically transparent material filling in the depressions and having a refractive index approximately equivalent to a refractive index of said optically anisotropic film in a direction of ordinary light rays and extraordinary light rays and configured to cover said first cyclically structural portion such that an edge surface of said second cyclically structural portion forms a plane approximately equal to a plane formed by the front surface of said optically anisotropic film,
wherein diffraction light having a diffraction angle greater than a predetermined angle among diffraction light diffracted by said diffraction grating is inhibited from being discharged outside of said optical isotropic substrate; and
a monitoring light ray generation mechanism configured to gather incident light and to reflect said incident light as a monitored light ray towards a monitoring photoreceptor for monitoring an amount of said monitored light ray.

4. A polarization splitting device, comprising:
an optically isotropic substrate;
an optically anisotropic film formed on said optically isotropic substrate; and means for diffracting incident light formed in said optically anisotropic film, said means for diffracting incident light comprising:
   means for passing ordinary light rays received in a first incident light direction without diffracting the ordinary light rays;
   means for diffracting extraordinary light rays received in a second incident light direction, opposite to the first incident light direction; and
   means for internally reflecting a predetermined order of the extraordinary light rays in said optically isotropic substrate to inhibit the predetermined order of the extraordinary light rays from being discharged outside of said optical isotropic substrate.

5. The polarization splitting device as defined in claim 4, wherein said predetermined order is of a second-order or higher-order diffracted light.

6. The polarization splitting device as defined in claim 4, wherein said optically anisotropic film is made of an inorganic substance formed by an oblique deposition process relative to a surface of said optically isotropic substrate.

7. The polarization splitting device as defined in claim 4, wherein said optically anisotropic film is made of a drawn organic substance.

8. The polarization splitting device as defined in claim 4, wherein said optically isotropic substrate has a polished surface for receiving and discharging light.

9. The polarization splitting device as defined in claim 4, further comprising polarization shifting means adhered to said optically anisotropic film for shifting a polarization of the ordinary light rays into the extraordinary light rays.

10. The polarization splitting device as defined in claim 4, further comprising monitoring light ray means for gathering incident light and for reflecting said incident light as a monitored light ray towards a monitoring means for monitoring an amount of said monitored light ray.

* * * * *